(12) United States Patent
Maruyama

(10) Patent No.: US 9,167,128 B2
(45) Date of Patent: Oct. 20, 2015

(54) COMMUNICATION APPARATUS, COMMUNICATION METHOD, AND STORAGE MEDIUM STORING PROGRAM

(71) Applicant: CANON KABUSHIKI KAISHA, Tokyo (JP)

(72) Inventor: Kenichi Maruyama, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/446,168

(22) Filed: Jul. 29, 2014

(65) Prior Publication Data

US 2015/0036809 A1 Feb. 5, 2015

(30) Foreign Application Priority Data

Jul. 31, 2013 (JP) ................................. 2013-159299

(51) Int. Cl.
*H04M 11/00* (2006.01)
*H04N 1/327* (2006.01)

(52) U.S. Cl.
CPC ................................. *H04N 1/32728* (2013.01)

(58) Field of Classification Search
CPC ............ H04N 1/0001; H04N 1/00037; H04N 1/00082; H04N 2201/0094; H04N 1/00042
USPC ............. 379/100.01, 100.05, 100.06, 100.15, 379/100.16
See application file for complete search history.

(56) References Cited

U.S. PATENT DOCUMENTS

| 2005/0031098 A1* | 2/2005 | Ito ............................. 379/100.01 |
| 2009/0080625 A1 | 3/2009 | Ogawa |
| 2009/0129558 A1 | 5/2009 | Ishizu |
| 2013/0083910 A1* | 4/2013 | Baba ........................ 379/100.01 |

FOREIGN PATENT DOCUMENTS

| EP | 2434212 A2 | 2/2012 |
| JP | 2005-057659 A | 3/2005 |

* cited by examiner

*Primary Examiner* — Stella L Woo
(74) *Attorney, Agent, or Firm* — Canon USA, Inc., IP Division

(57) ABSTRACT

An apparatus to which a telephone line can be connected, the apparatus comprising: a first determination unit configured to determine, based on a change amount of a line direct-current voltage from the telephone line per time period, whether the line direct-current voltage is stable; a second determination unit configured to determine whether the line direct-current voltage from the telephone line is a first threshold or lower; and a third determination unit configured to, if the first determination unit determines that the line direct-current voltage is stable and if the second determination unit determines that the line direct-current voltage is the first threshold or lower, determine that the external telephone has captured the telephone line.

15 Claims, 8 Drawing Sheets

COMMUNICATION APPARATUS, COMMUNICATION METHOD, AND STORAGE MEDIUM STORING PROGRAM

BACKGROUND OF THE INVENTION

1. Field of the Invention

The present invention relates to a communication apparatus to which an external telephone can be connected, a communication method, and a storage medium storing a program.

2. Description of the Related Art

In recent years, in facsimile apparatuses, in order to reduce a facsimile function in size, reduce costs, and implement a common circuit adaptable to country-by-country postal, telegraph and telephone (PTT) standards, a data access arrangement (DAA), which is a semiconductor integrated circuit (IC), has been used for a telephone network controller.

Some apparatuses having a facsimile function, such as multifunction printer apparatuses, have a terminal to which an external telephone is connected, so as to share a telephone line with a telephone.

Japanese Patent Laid-Open No. 2005-57659 discloses a voltage detection system in which hook detection of an on-hook/off-hook state of an external telephone is performed by a DAA detecting a line direct-current voltage.

However, in the voltage detection system disclosed in Japanese Patent Laid-Open No. 2005-57659, when a certain variation in line direct-current voltage occurs even due to a cause other than line capture performed by the external telephone, the variation is falsely detected as an on-hook/off-hook state of the external telephone.

SUMMARY OF THE INVENTION

An aspect of the present invention provides a communication apparatus and a communication method in which the above-mentioned problem has been solved. Another aspect provides a communication apparatus and a communication method that reduce false detection which may occur when a variation in line direct-current voltage due to a cause other than an on-hook/off-hook state of an external telephone occurs.

An apparatus of the present invention for solving the above-mentioned problem is an apparatus to which a telephone line can be connected. The apparatus includes: a first determination unit configured to determine, based on a change amount of a line direct-current voltage from the telephone line per time period, whether the line direct-current voltage is stable; a second determination unit configured to determine whether the line direct-current voltage from the telephone line is a first threshold or lower; and a third determination unit configured to, if the first determination unit determines that the line direct-current voltage is stable and if the second determination unit determines that the line direct-current voltage is the first threshold or lower, determine that the external telephone has captured the telephone line.

Further features of the present invention will become apparent from the following description of exemplary embodiments with reference to the attached drawings.

DESCRIPTION OF THE EMBODIMENTS

First Embodiment

An embodiment of the present invention will be described in detail below with reference to the drawings.

Figure 1:
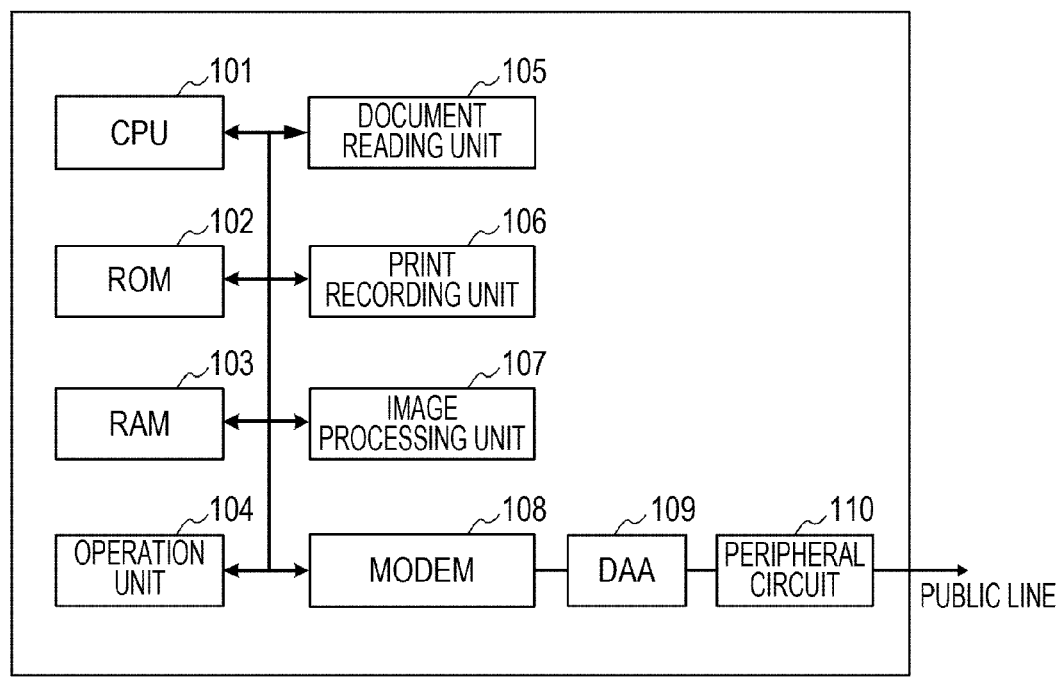
FIG. 1 is a block diagram illustrating a communication apparatus according to an embodiment.

FIG. 1 is a block diagram of a communication apparatus including a DAA.

The communication apparatus includes a central processing unit (CPU) 101, a read only memory (ROM) 102, a random access memory (RAM) 103, an operation unit 104, a document reading unit 105, a print recording unit 106, an image processing unit 107, a modem 108, a DAA 109, and a peripheral circuit 110. This communication apparatus has a facsimile function.

The CPU 101 controls, on the basis of a control program or the like regarding facsimile communication, display, recording, or the like that is stored in the ROM 102, the entire communication apparatus by using part of the RAM 103 as a work area.

The RAM 103 is used as, for example, an area in which an image read by the document reading unit 105 is temporarily stored, in addition to the work area.

The operation unit 104 includes a light-emitting diode (LED) display, a compact liquid crystal display (LCD), and/or the like that display/displays a state of the communication apparatus, in addition to operation buttons, such as a numeric keypad, cursor keys, a start key, and a stop key. A user may make a telephone call to a certain person by using the numeric keypad, select various menus by using the cursor keys or start key, or give an instruction to perform an operation, such as facsimile transmission.

The document reading unit 105 includes a contact image sensor, a gate array for appropriately performing image processing on read data, and so forth, and scans a document and generates image data. The generated image data is temporarily stored in the RAM 103 and subjected to facsimile transmission via a communication unit (the modem 108, the DAA 109, and the peripheral circuit 110), or transferred to the print recording unit 106 and printed.

The print recording unit 106 is, for example, an ink-jet, thermal recording, thermal transfer recording, or electrophotographic printer. The print recording unit 106 is capable of printing a facsimile reception image on recording paper, or printing various soft parameters stored in the RAM 103.

The communication unit includes the modem 108, the DAA 109, and the peripheral circuit 110, and modulates or demodulates an electrical signal to be transmitted or received in order to make a telephone call or perform facsimile communication to a number input via the operation unit 104.

Figure 2:
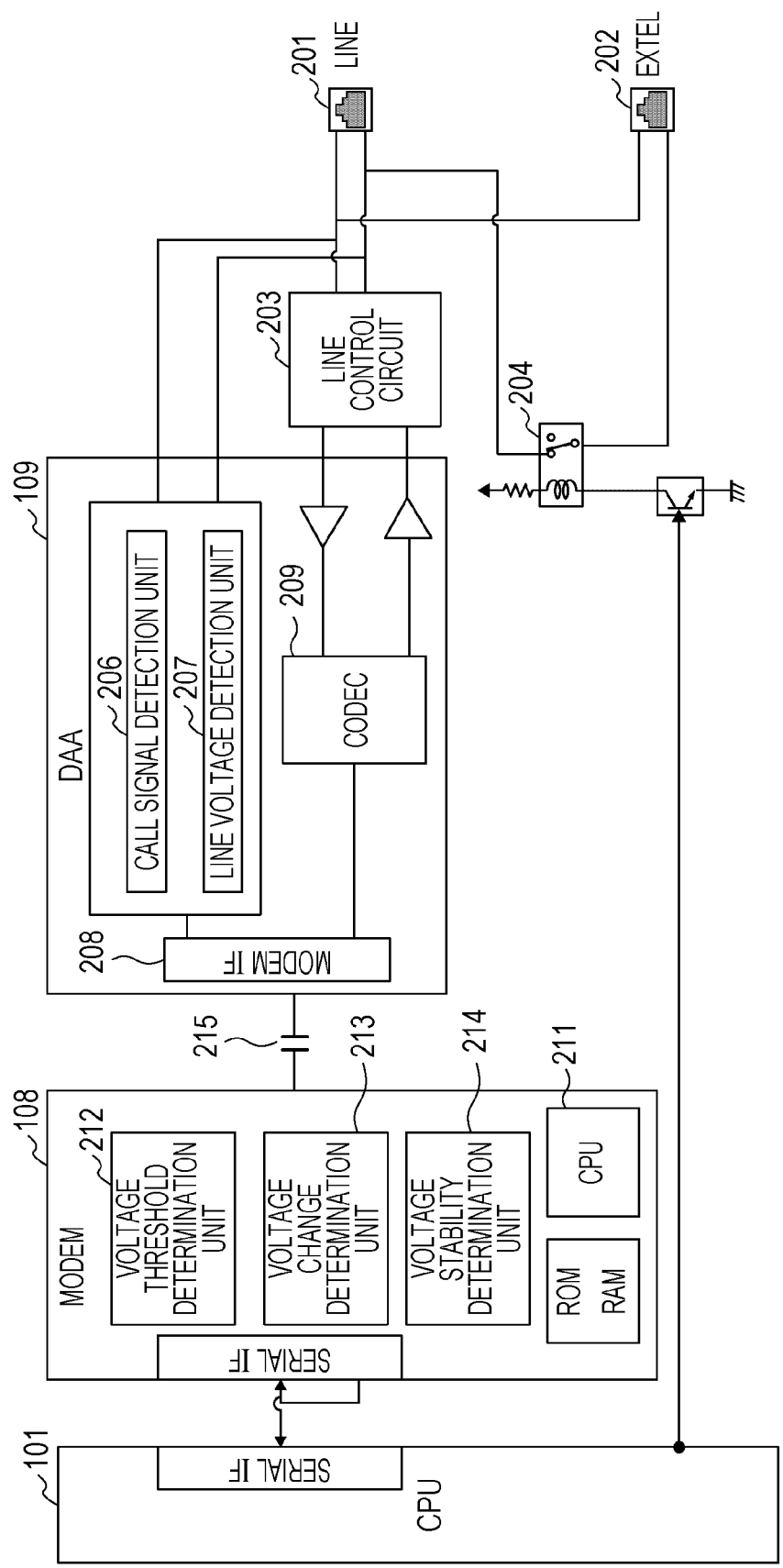
FIG. 2 is a detailed block diagram of part of the communication apparatus according to this embodiment.

Here, the CPU 101, the modem 108, the DAA 109, and the peripheral circuit 110 will be described in detail with reference to FIG. 2. FIG. 2 is a detailed block diagram of part of the block diagram of the communication apparatus according to this embodiment.

The communication apparatus includes the above-mentioned CPU 101, modem 108, and DAA 109, a telephone line connection terminal 201, an external telephone connection terminal 202, a line control circuit 203, an external telephone disconnecting relay 204, and an isolation capacitor 215.

The isolation capacitor 215 is provided between the DAA 109 and the modem 108 so that a primary side and a secondary side of a line are isolated from each other. As for the external telephone disconnecting relay 204, a primary side and a secondary side of this external telephone disconnecting relay 204 are isolated from each other. In this embodiment, the isolation capacitor 215 is provided between the DAA 109 and the modem 108; alternatively, an isolation element, such as a transformer, or both an isolation capacitor and a transformer may be provided.

As described above, the CPU 101 controls the entire communication apparatus. The CPU 101 includes a serial interface (IF) and operates as a host for the modem 108.

The DAA (line control IC) 109 includes a call signal detection unit 206, a line voltage detection unit 207, a modem interface (modem IF) 208, and a coder/decoder (CODEC) unit 209. The DAA 109 is a line control IC and controls the line control circuit 203. Furthermore, the DAA 109 communicates with the modem 108 via the modem interface 208 and performs data transmission/reception required for facsimile communication control.

The call signal detection unit 206 detects a call signal coming from a telephone line via the telephone line connection terminal 201 and passes it to the modem 108. Then, a CPU 211 to be described reads the cadence of that call signal. The telephone line here may be a public switched telephone network (PSTN), or a private network in which a private branch exchange (PBX) is used as an exchange.

The line voltage detection unit 207 samples a line direct-current voltage occurring across tip and ring (T/R) lines and digitizes it. Then, the digitized line direct-current voltage is transmitted to the modem 108 via the modem interface 208.

The modem interface 208 performs data communication between the DAA 109 and the modem 108 by using its own data communication scheme.

The CODEC unit 209 is a digital-to-analog (D/A) and analog-to-digital (A/D) converter. The CODEC unit 209 receives digital data from the modem 108, converts it into analog data, and transmits the analog data to a person at the other end of communication via the telephone line. Furthermore, the CODEC unit 209 receives analog data, which is a facsimile signal transmitted from a person at the other end of communication, converts it into digital data, and transmits the digital data to the modem 108. The telephone line connection terminal 201 is a terminal which is connected to the telephone line, and a line direct-current voltage and an alternating-current voltage, such as a call signal, are supplied across two lines of T/R from an exchange on the telephone line. That is, the telephone line connection terminal 201 connects the communication apparatus and the telephone line.

The external telephone connection terminal 202 is a terminal which is connected to an external telephone.

The line control circuit 203 is a passive element group composed of components, such as a transistor and a resistor which are controlled by the DAA 109. The line control circuit 203 is connected to the telephone line via the telephone line connection terminal 201, and performs, in conformity with national PTT standards of each country, for example, an operation to be performed when, as the communication apparatus, the line control circuit 203 is connected to the telephone line, direct current control, and transmission/reception of an alternating-current signal.

The external telephone disconnecting relay 204 is controlled by the CPU 101, and is a relay for disconnecting the connection between the telephone line connection terminal 201 and the external telephone connection terminal 202 when the line control circuit 203 and the DAA 109 capture the line.

The modem 108 includes a voltage threshold determination unit 212, a voltage change determination unit 213, a voltage stability determination unit 214, the CPU 211, a ROM, a RAM, and a serial IF, such as an RS-232C serial interface. The modem 108 is connected to the CPU 101 serving as the host via the serial IF, operates on the basis of an instruction from the host, and responds to the host. This instruction is called a command. In this embodiment, the CPU 101 and the modem 108 are connected to each other via the serial IFs; however, another interface, such as a parallel interface, may be used in place of a serial IF.

The modem 108 includes the CPU 211, which is different from the CPU 101, and memories, which are the ROM and RAM. The CPU 211 executes a program stored in the ROM or RAM, and the modem 108 thereby performs line control, protocol control, and communication data processing that are required for facsimile communication.

When the DAA 109 has controlled the line control circuit 203 and has not captured the line, that is, when the communication apparatus is in an on-hook state, the voltage threshold determination unit 212 receives a line direct-current voltage which has been detected and digitized by the line voltage detection unit 207. Then, the voltage threshold determination unit 212 compares the line direct-current voltage with a preset threshold voltage. Here, in a state where the external telephone connected to the communication apparatus is connected to the telephone line, to lift a handset of the external telephone so as to capture the line is to put the telephone in an off-hook state, and to put down the handset so as to open the line is to put the telephone in an on-hook state. The off-hook/on-hook states are not limited to lifting/putting down the handset. Among these operations are operations (a press of an on-hook button, automatic answer, and the like) corresponding to these operations. A threshold voltage used by the voltage threshold determination unit 212 will be described in detail later.

The voltage change determination unit 213 determines whether or not a change in voltage values digitized on the basis of results obtained by the line voltage detection unit 207 performing sampling a predetermined number of times at predetermined intervals of a few ms to several tens of ms is due to an off-hook state of the external telephone. In this embodiment, the voltage change determination unit 213 averages the values which have been sampled, excludes an unstable voltage change due to noise or chattering in line direct-current voltage, and thus grasps a more accurate voltage change, more details on which will be described below. As a result, when an average value of the sampled voltage values is less than a specified value and when a comparison result provided by the voltage threshold determination unit 212 is that the line direct-current voltage is the threshold voltage or lower, it is determined that the external telephone connected to the external telephone connection terminal 202 has been put into an off-hook (line capture) state. Subsequently, the modem 108 notifies the CPU 211 of hook detection.

Now, a variation in line direct-current voltage due to a cause other than an on-hook/off-hook state of the external telephone will be described with reference to FIGS. 3 to 6.

Figure 3:
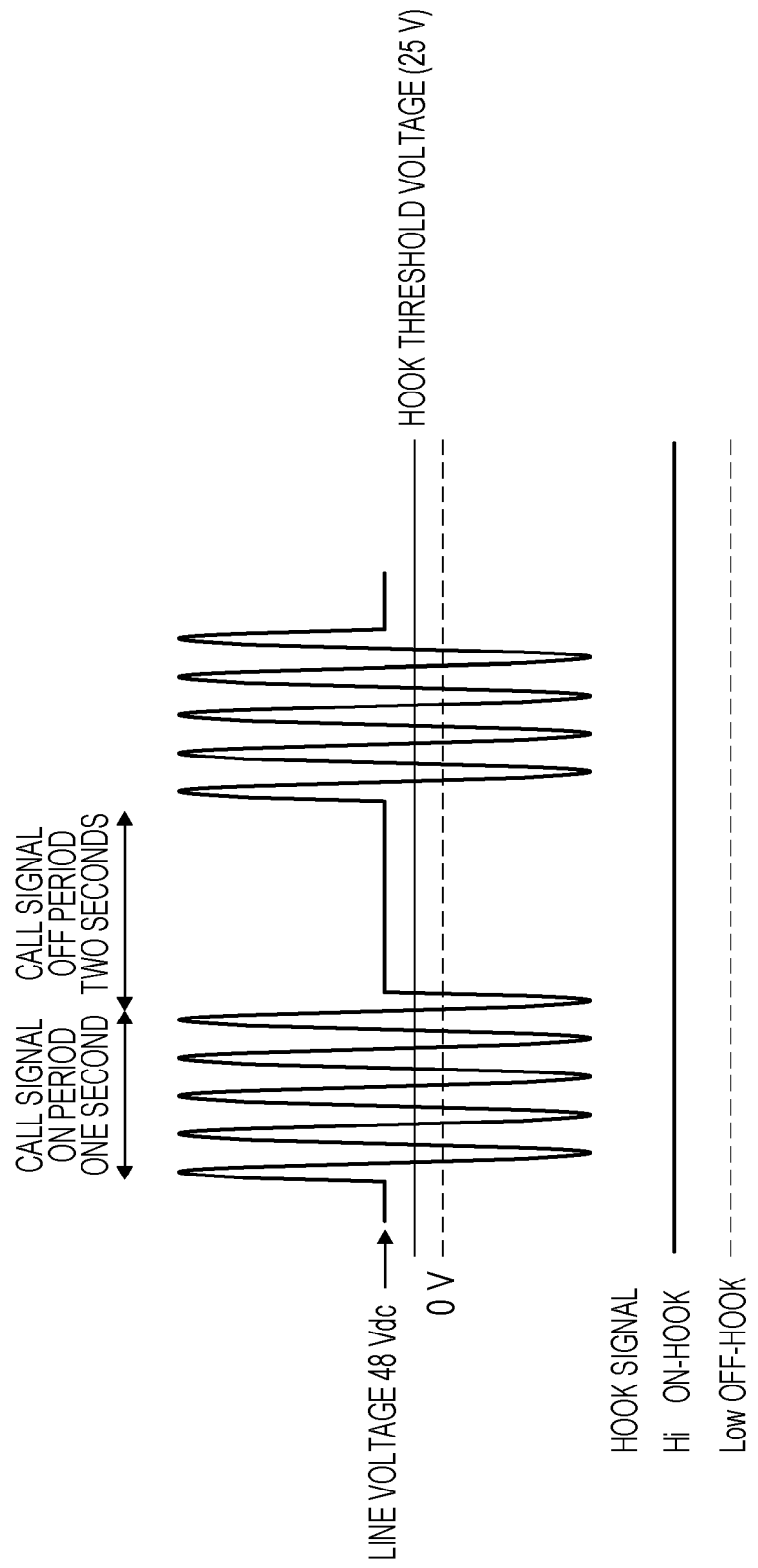
FIG. 3 illustrates a waveform of a typical call signal.

FIG. 3 illustrates a waveform, which is a waveform of a call signal supplied from a typical exchange in Japan, obtained when an external telephone, which is a terminal, has not answered a call signal (on-hook). As illustrated in FIG. 3, this direct-current voltage is supplied by the exchange at all times, and occurs even during an OFF period of the call signal. The terminal, such as a telephone or facsimile, receives a voltage that is the direct-current voltage, which is a line voltage, on which an alternating-current voltage (call signal) output from the exchange has been superimposed. In this way, a direct-current voltage, which is a line voltage, is used for an on-hook/off-hook determination, and an alternating-current voltage is used as a call signal.

A hook threshold voltage used for the on-hook/off-hook determination here is appropriately set in accordance with line conditions, such as an amount of variation in voltage (amount of voltage drop) obtained upon an off-hook state of the external telephone, a distance from the exchange on the telephone line, and a line current value. The amount of variation in voltage obtained upon an off-hook state of the external telephone varies with an impedance that the terminal has and a value of a line current sent by the exchange. In this embodiment, the hook threshold voltage is 25 V. That is, in this embodiment, a threshold voltage used for a determination made by the voltage threshold determination unit 212 is set to 25 V, and the fact that a voltage becomes 25 V or lower is detected as off-hook. In FIG. 3, because the telephone has not been put in an off-hook state, the level of a HOOK signal is Hi (i.e., ON-HOOK) at all times.

An alternating-current voltage, which is a call signal from the exchange, is output from the exchange at a voltage and frequency within a range specified by national standards of each country. The alternating-current voltage is typically several tens of Vrms to a hundred and several tens of Vrms, and varies among exchanges. In Japan, typically, a direct-current voltage is 48 V (polarity is not defined), an alternating-current frequency is 15 to 20 Hz, an alternating-current voltage is 65 to 83 Vrms, and, in an ON-OFF cadence of alternating-current superimposition (repeated time period), ON of alternating-current superimposition is one second and OFF of alternating-current superimposition is two seconds. The voltage, frequency, and cadence of a call signal vary among countries or regions, and are generally specified by the national PTT standards of each country. For example, in Australia, there are as follows: a frequency of 15.3 Hz, an alternating-current voltage of 90 Vrms, 0.4-0.2-0.4-2.0 seconds (ON-OFF-ON-OFF), etc. In Brazil, there are as follows: a frequency of 30 Hz, an alternating-current voltage of 70 Vrms, 1-4 seconds (ON-OFF), etc.

Figure 4:
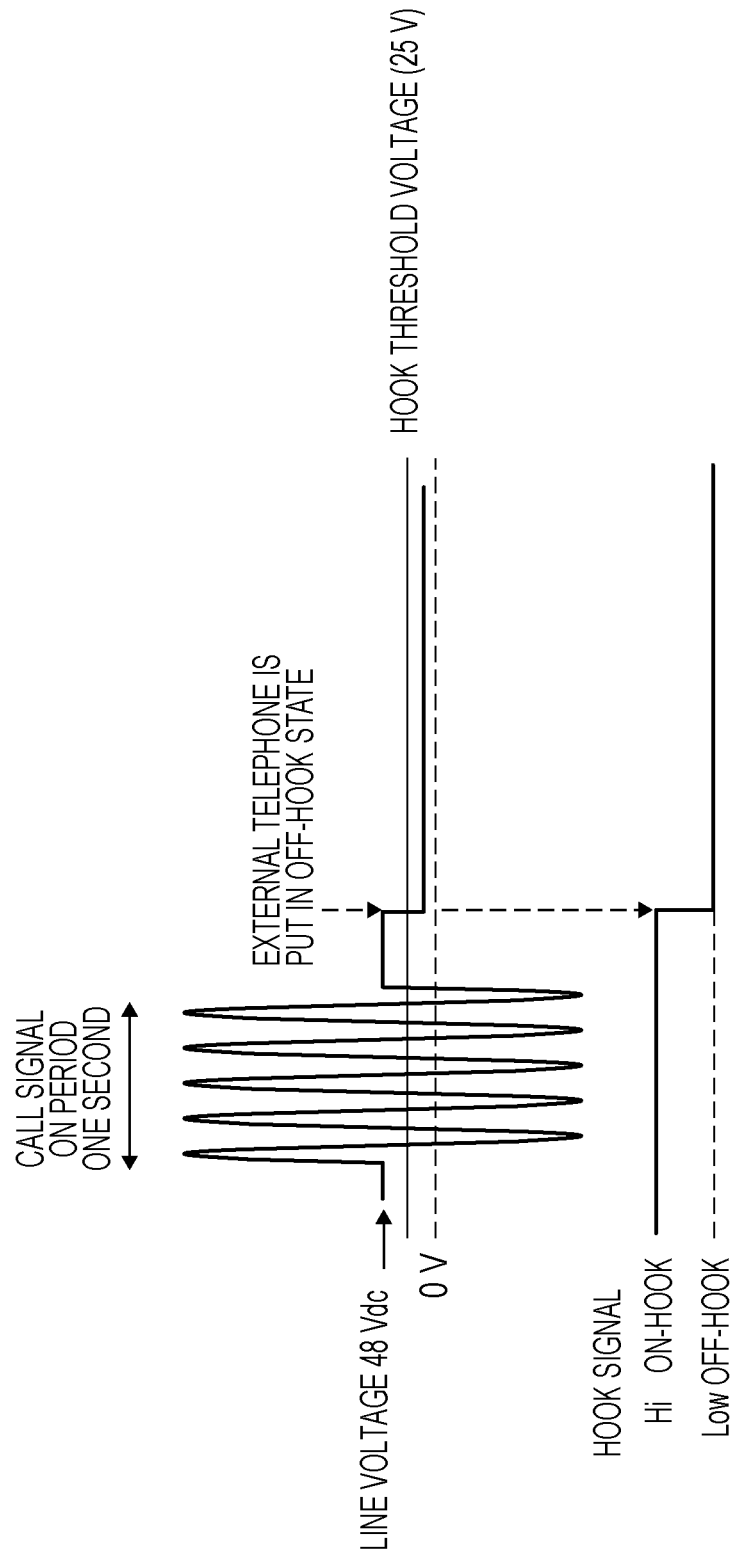
FIG. 4 illustrates a case where an external telephone answers a normal call signal.

FIG. 4 illustrates a waveform obtained when an external telephone, which is a terminal, answers a call signal (off-hook). When the terminal is put in an off-hook state, a line current flows via the terminal. The exchange detects the flowing current and the exchange side thereby detects a terminal usage state. As illustrated in FIG. 4, when the terminal is put in an off-hook state, the line voltage decreases from 48 V to a few V to a few dozen V, and becomes lower than the hook threshold voltage of 25 V. At this time, the level of the HOOK signal becomes Low (i.e., OFF-HOOK).

Because the line voltage is the direct-current voltage on which the call signal (alternating-current signal) is superimposed while the call signal (alternating-current signal) is coming, the voltage change determination unit 213 is not able to correctly make a determination on the direct-current voltage. For this reason, while the call signal (alternating-current signal) is coming, the voltage change determination unit 213 does not make a determination on a change in voltage.

As described above, an off-hook state of the external telephone is detected by monitoring a voltage drop of the line voltage. However, in some cases, a variation in line direct-current voltage due to a cause other than an on-hook state/off-hook state of the external telephone occurs.

Figure 5:
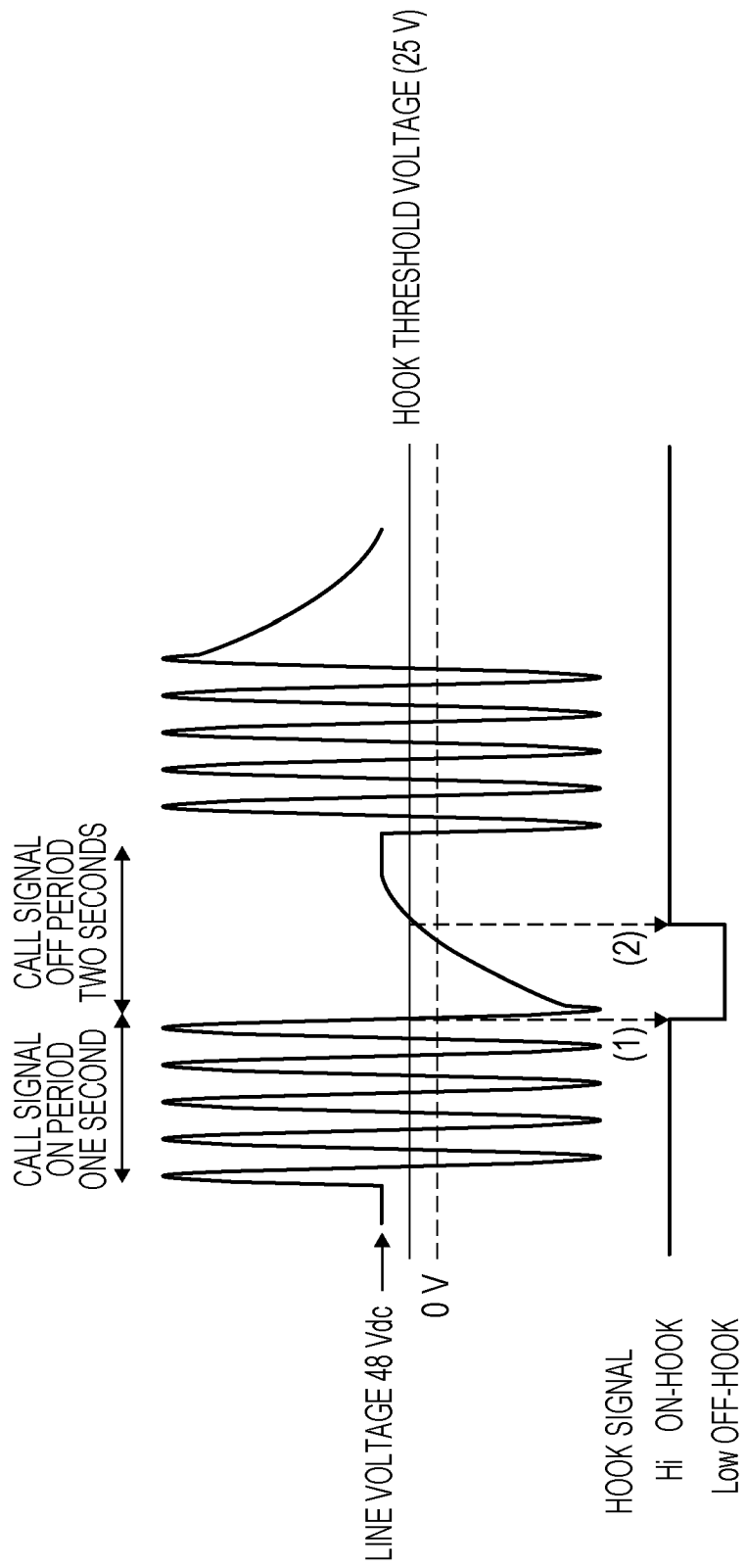
FIG. 5 illustrates related art regarding an off-hook determination in a call signal whose voltage varies.

FIG. 5 illustrates a waveform representing a variation in line direct-current voltage due to a cause other than an on-hook/off-hook state of an external telephone. FIG. 5 is a diagram citing the following Nippon Telegraph and Telephone Corporation (NTT) Technical Reference.

<NTT Technical Reference: Telephone Service Interface, see page 28>
URL:
http://web116.jp/shop/annai/gisanshi/analog/analog.html
File name: analog gisanshi.pdf As illustrated in FIG. 5, in some cases, during an OFF period of a call signal (cadence), that is, during a period for which only the direct-current voltage is being applied after an alternate current is turned OFF, the direct-current voltage gradually decreases or increases due to, for example, the exchange or a load on a line (path) of the telephone line. If such instability of voltage occurs in the line voltage after supply of the call signal from the exchange has been stopped, it may falsely be determined to be an off-hook state though not being in an off-hook state.

The voltage threshold determination unit 212 does not perform hook detection during an ON period of the call signal (cadence) illustrated in FIG. 5, and performs hook detection during the OFF period of the cadence. Here, the OFF period of the call signal starts at a point in time denoted by (1) in FIG. 5. In an existing technique, when the direct-current voltage is monitored by performing hook detection based on a voltage detection technique from this point in time, the level of the HOOK signal becomes Low (OFF-HOOK) at the point in time (1) when the direct-current voltage falls below the specified threshold as illustrated in FIG. 5.

Subsequently, because the direct-current voltage gradually increases and exceeds the specified threshold at a point in time (2), the level of the HOOK signal returns to Hi (ON-HOOK) at the point in time (2).

However, a change in the HOOK signal level involved in a change in the direct-current voltage during the OFF period of the call signal illustrated in FIG. 5 is not a change in the HOOK signal level, Low/Hi (OFF-HOOK/ON-HOOK), due to an off-hook state of the external telephone as illustrated in FIG. 4. Actually, the external telephone has not been in an off-hook state. That is, off-hook detection performed during the period from (1) to (2) is false detection.

Here, an operation performed by the voltage change determination unit 213 will be described. An algorithm of a sampling and averaging operation performed by the voltage change determination unit 213 is set in such a manner as to be able to discriminate a voltage change due to an off-hook state of the external telephone from a voltage change due to noise or chattering. Specifically, the voltage change determination unit 213 includes a first counter and performs, upon a voltage change, sampling a specified number of times at intervals of about a few ms with the first counter. Then, it is determined that a voltage change occurring within a few ms counted by the first counter or a predetermined time period (a few ms×N times) is a voltage change due to noise or chattering. However, as for the above-mentioned slow voltage change over a few seconds, the change is not able to be detected correctly by performing sampling using the first counter. At the point in time (1), which is a change point at which the direct-current voltage crosses the hook threshold, the change is falsely detected as off-hook.

Here, an example in which hook detection is performed in accordance with a determination as to whether or not the line voltage has fallen below the specified threshold is described;

however, in some pieces of related art, hook detection is performed in accordance with a determination on the polarity (+/−) of the line voltage at the point in time (1). In this case as well, during a period for which the absolute value of the line voltage is a lower than the positive threshold or higher than the negative threshold, for example, during a period for which the line voltage exists within a range from −25 V to +25 V in FIG. 5, the level of the HOOK signal is Low (OFF-HOOK) as well.

In this embodiment, the modem 108 includes the voltage stability determination unit 214 in addition to the voltage threshold determination unit 212 and the voltage change determination unit 213, and thus the above-mentioned false detection of off-hook is reduced. In this embodiment, the voltage stability determination unit 214 determines a change in line direct-current voltage occurring across the T/R lines in the telephone line connection terminal 201, that is, voltage stability.

Figure 7:
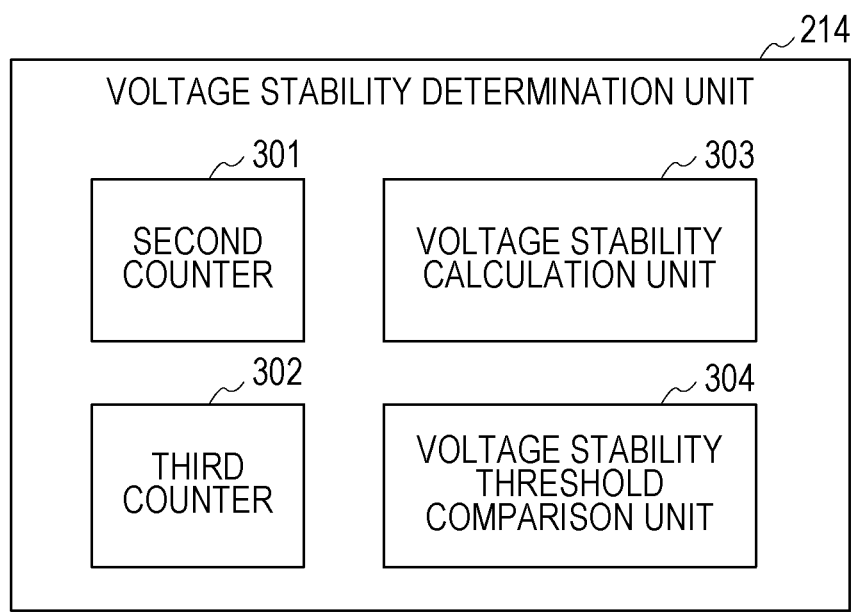
FIG. 7 is a block diagram of a voltage stability determination unit according to the first embodiment.

Here, the voltage stability determination unit 214 according to this embodiment will be described with reference to FIG. 7. FIG. 7 is a block diagram of the voltage stability determination unit 214 illustrated in FIG. 2.

As illustrated in FIG. 7, the voltage stability determination unit 214 includes a second counter 301, a third counter 302, a voltage stability calculation unit 303, and a voltage stability threshold comparison unit 304, and they are connected to each other with a system bus.

The second counter 301 is a counter which is different from the first counter and is capable of counting up to several tens to several hundreds of ms.

The third counter 302 is a counter which counts a stop period of a call signal, that is, a period for which supply of a call signal has been stopped. While the third counter 302 is counting an elapsed time of the stop period of a call signal, that is, a time period that has elapsed since supply of the call signal has been stopped, the voltage stability determination unit 214 makes a determination. In this embodiment, a time period to be counted by the third counter 302 is set to a maximum of five seconds; however, the time period is not limited to this and may be appropriately changed. The counter is cleared when a subsequent call signal comes, and it is therefore advisable to lengthen the time period to be counted by the third counter 302. This is because, if the time period to be counted by the third counter 302 is set to a short time period, when the third counter 302 finishes counting, the determination is finished, and false detection is more likely to occur. On the other hand, if the time period to be counted by the third counter 302 is set to an excessively long time period, a circuit scale increases, thereby resulting in an increase in cost. Hence, the time period to be counted by the third counter 302 may be appropriately set in consideration of such problems.

Both the second counter 301 and the third counter 302 are cleared when the call signal detection unit 206 detects a subsequent call signal.

The voltage stability calculation unit 303 calculates a voltage change per time period as voltage stability successively. Specifically, an amount of change in voltage $\Delta V$ per second counter 301 ($\Delta t$), that is, $\Delta V/\Delta t$ is defined as the voltage stability. A period with which the voltage stability is calculated is shorter than an OFF period of a call signal if possible. Because the period is correlated with a time period that elapses before the modem 108 makes a determination of off-hook or not, it is advisable that the period is set to a short time period. In this embodiment, the period is set to a 200 ms period.

The voltage stability threshold comparison unit 304 has a threshold of voltage stability in advance, compares the threshold with the voltage stability calculated by the voltage stability calculation unit 303, and determines whether or not to notify the CPU 101 of hook detection. When the voltage stability calculated by the voltage stability calculation unit 303 is less than a predetermined value, it is determined that a line voltage is stable, and the CPU 101 is notified of hook detection. On the other hand, when the voltage stability is the predetermined value or more, it is determined that a line voltage is unstable, and the CPU 101 is notified that the external telephone remains on-hook.

A threshold of voltage stability is calculated by measuring a variation in voltage during the stop period of a call signal, and may be appropriately set in consideration of specifications of an exchange, a state of a line from the exchange to a terminal, and so forth. In some cases, a variation in voltage during the stop period of a call signal varies among countries. That is, the threshold of voltage stability may be appropriately set in accordance with a place where a communication apparatus is installed or the type of an exchange that supplies a call signal.

As described above, in some cases, a variation in voltage from the exchange during the stop period of a call signal varies among countries. In this embodiment, a variation in voltage from an exchange during the stop period of a call signal in Japan is estimated at about 48 V/1.5 seconds (i.e., 32 V/second), and the threshold of voltage stability is set to 25 V/second. That is, when the voltage stability is less than 25 V/second, the voltage stability threshold comparison unit 304 determines that a line voltage is stable, and when the voltage stability is 25 V/second or more, the voltage stability threshold comparison unit 304 determines that a line voltage is unstable.

Here, an off-hook determination according to this embodiment will be described with reference to FIG. 6.

Figure 6:
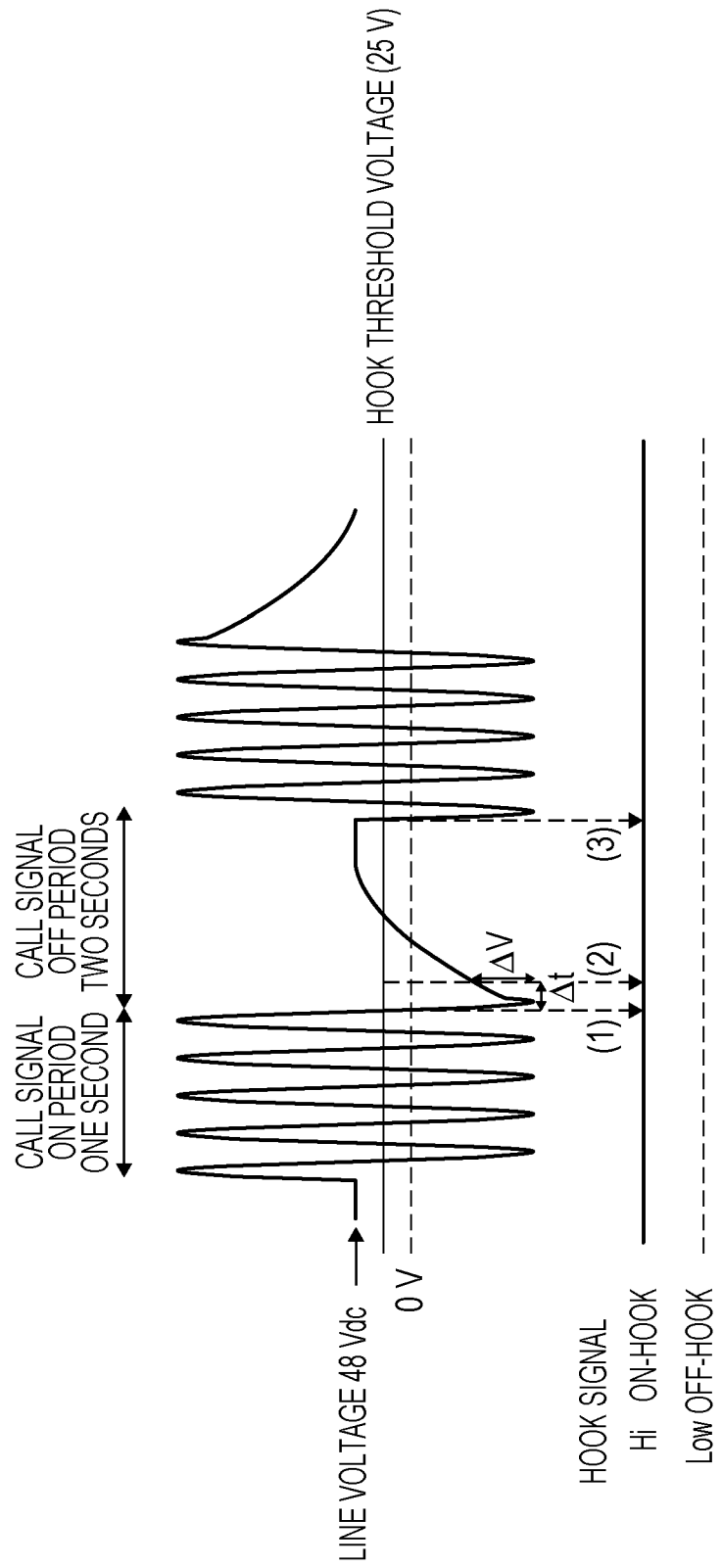
FIG. 6 illustrates an off-hook determination according to a first embodiment in a call signal whose voltage varies.

First, the call signal detection unit 206 detects that a call signal has come from the exchange, and then detects that supply of the call signal has been stopped ((1) in FIG. 6).

Then, both the second counter 301 and the third counter 302 start counting up from a point in time (1) in FIG. 6. The second counter 301 is capable of counting a period of $\Delta t$ illustrated in FIG. 6. A second counter 301 ($\Delta t$) can be set to a period of several tens of ms to a period of several hundreds of ms, and is set to 200 ms here.

While the third counter 302 is counting up and every time the second counter 301 finishes counting (that is, every 200 ms in the case of this embodiment), the line voltage detection unit 207 samples a voltage value. The voltage stability determination unit 214 calculates an amount of change in voltage $\Delta V$ during a period on the basis of the sampled voltage value. Here, an amount of change in voltage $\Delta V$ per 200 ms is calculated, and it is determined whether or not the amount of change in voltage $\Delta V$ per 200 ms is less than the threshold of voltage stability (25 V/second, i.e., 5 V/200 ms). When the voltage stability calculated by the voltage stability calculation unit 303 is less than 5 V/200 ms, the voltage stability threshold comparison unit 304 determines that a line voltage is stable, and notifies the CPU 101 of hook detection. When the voltage stability calculated by the voltage stability calculation unit 303 is 5 V/200 ms or more, the voltage stability threshold comparison unit 304 determines that a line voltage is unstable, and does not notify the CPU 101 of hook detection.

When the third counter 302 finishes counting or when a subsequent call signal comes, the second counter 301 and the third counter 302 are reset to 0, and sampling ends.

Figure 8:
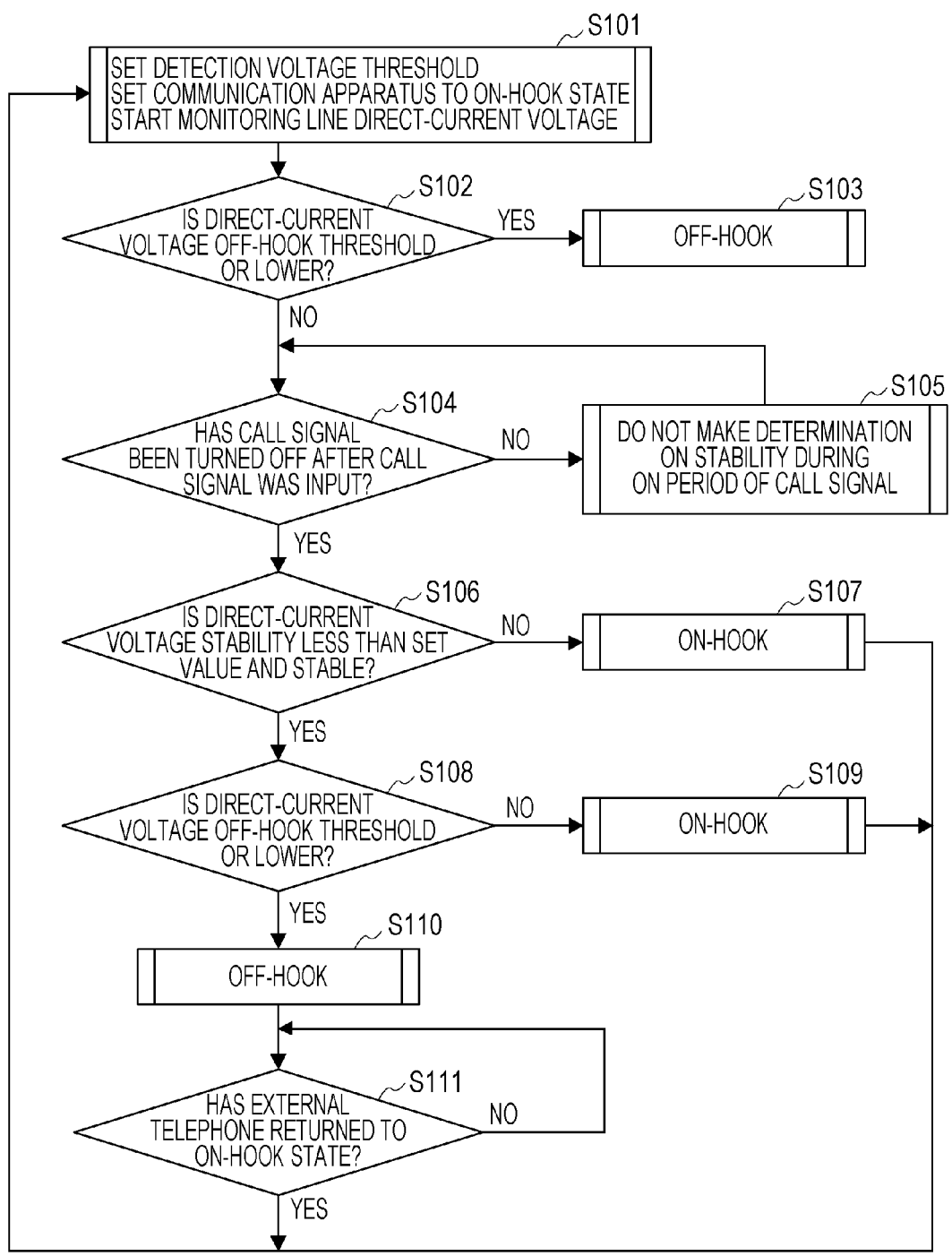
FIG. 8 is a flowchart illustrating operations according to the first embodiment.

Next, an operation flow according to this embodiment will be described with reference to FIG. 8. The flow illustrated in FIG. 8 is executed by the CPU 211 included in the modem 108.

The following flow is a flow executed after a power supply has been turned on in a state where the communication apparatus according to this embodiment is connected to the external telephone and the telephone line is connected to the communication apparatus.

First, the CPU 101 and the modem 108 communicate with each other, and then an initial setup is performed for the voltage threshold determination unit 212, the voltage change determination unit 213, and the voltage stability determination unit 214 which are included in the modem 108, and the call signal detection unit 206 and the line voltage detection unit 207 which are included in the DAA 109 (S101). Specifically, the CPU 101 commands the modem 108 to be in an on-hook state (line opening operation). At the same time, the CPU 101 commands the modem 108 to set a detection voltage threshold and a voltage stability threshold in the voltage threshold determination unit 212 and the voltage stability determination unit 214, respectively, to set respective timers of the first to third counters, and to start monitoring a line direct-current voltage.

The modem 108 which has been commanded to start monitoring the line direct-current voltage samples the value of a voltage appearing across the T/R lines of the telephone line by using the line voltage detection unit 207 included in the DAA 109, and stores the voltage value in the RAM, which is a memory included in the modem 108, via the modem interface 208.

Then, the voltage threshold determination unit 212 compares a result obtained by sampling a voltage across the T/R lines of the telephone line with a preset off-hook voltage threshold, and determines whether or not the direct-current voltage is the off-hook voltage threshold or lower (S102). Specifically, the voltage threshold determination unit 212 determines whether or not the voltage across the T/R lines of the telephone line is an off-hook threshold of 25 V or lower. In this embodiment, a determination as to whether or not the direct-current voltage is the off-hook voltage threshold or lower is made; alternatively, a determination as to whether or not the direct-current voltage is lower than the off-hook voltage threshold may be made.

Here, when the line voltage read by the line voltage detection unit 207 is the off-hook threshold of 25 V or lower, the process flow proceeds to S103, and when the line voltage is higher than the threshold, the process flow proceeds to S104.

In S103, the voltage threshold determination unit 212 notifies, via the modem 108, the CPU 101 that the external telephone has been put in an off-hook state. The CPU 101 having received the notification notifies, by using a user interface, the user that the external telephone has been put in an off-hook state, and also causes the entire communication apparatus to shift to an operation to be performed during use of the line.

In S104, the call signal detection unit 206 sequentially notifies the modem 108 of ON representing a period for which a call signal is coming from the exchange, and OFF representing a stop period for which supply of the call signal has been stopped. The modem 108 determines whether or not the call signal has been turned off after the call signal was input. Here, when the call signal from the exchange exists within an ON period, the process flow proceeds to S105, and the voltage threshold determination unit 212 does not operate. On the other hand, when the call signal comes into the stop period (OFF), that is, when it is determined that the call signal has been turned off, the process flow proceeds to S106.

In S106, the voltage stability determination unit 214 determines whether or not direct-current voltage stability is less than a set threshold. Specifically, the voltage threshold determination unit 212 analyzes sampled voltage values stored in chronological order in the RAM included in the modem 108. Then, the voltage stability determination unit 214 calculates voltage stability and compares the voltage stability with a voltage stability threshold. In this embodiment, a value of voltage stability $\Delta V/\Delta t$ is calculated every 200 ms, and it is determined whether or not the value is less than a preset value of 5 V/200 ms. In this embodiment, a determination as to whether or not the direct-current voltage stability is less than the set threshold is made; alternatively, a determination as to whether or not the direct-current voltage stability is the set threshold or less may be made.

When the voltage stability is the preset voltage stability threshold (5 V/200 ms) or more (NO in S106), the process flow proceeds to S107, and when the voltage stability is less than the voltage stability threshold (5 V/200 ms) (YES in S106), the process flow proceeds to S108.

In S107, because an amount of change in voltage during a certain time period is the preset voltage stability threshold or more, it is determined that the voltage across the T/R lines is in an unstable state, in which voltage varies, at this time, and it is determined that the external telephone is not in an off-hook state. Hence, the CPU 101 is notified, via the modem 108, that the external telephone remains on-hook.

In S108, the voltage threshold determination unit 212 determines again, in the same manner as S102, whether or not the voltage whose voltage stability is less than the voltage stability threshold and which is in a "stable" off-hook voltage state in the determination in S106 is the off-hook threshold or lower.

As described above, it is determined, by using the voltage stability threshold, whether or not the voltage is stable (S106), and it is determined, by using the off-hook threshold (hereinafter also referred to as a detection voltage threshold), whether or not an off-hook state exists (S108). When the both thresholds are satisfied, that is, when the direct-current voltage stability is less than the set value in S106 and when the on-hook voltage is higher than the detection voltage threshold in S108, the process flow proceeds to S109. On the other hand, when the direct-current voltage stability is less than the set value in S106 and when the on-hook voltage is the detection voltage threshold or lower, the process flow proceeds to S110.

As in S107, in S109, it is determined that the external telephone is not in an off-hook state. Then, the CPU 101 is notified, via the modem 108, that the external telephone remains on-hook.

In S110, it is determined that the external telephone is in an off-hook state, and the CPU 101 is notified, via the modem 108, that the external telephone has been put in an off-hook state as in S103. The CPU 101 notified of off-hook notifies, by using the user interface, the user that the external telephone has been put in an off-hook state, and also causes the entire communication apparatus to shift to an operation to be performed during use of the line.

In S111, it is determined whether or not the external telephone being in an off-hook state has returned to an on-hook state. When the external telephone being in an off-hook state returns to an on-hook state, the process flow returns to S101. When the external telephone being in an off-hook state does not return to an on-hook state, the process flow waits in S111.

According to this embodiment, even in the communication apparatus connected to a telephone line having a direct-current voltage that varies transiently and slowly, hook detection of the external telephone may be performed at high speed while preventing false hook detection of the external telephone. Specifically, a fast voltage change due to an off-hook state of the external telephone and a slow voltage change occurring during a stop period for which supply of a call signal has been stopped are individually monitored, and hook detection of the external telephone may thereby be performed at high speed while preventing false hook detection of the external telephone. In other words, a slow voltage change occurring during the stop period of a call signal is monitored, and false detection of off-hook may thereby be prevented.

If sampling of a line voltage is not performed during a period for which a call signal is coming, and also if sampling of the line voltage is discontinued during a predetermined time period of the stop period of the call signal and a hook determination is made after the predetermined time period has elapsed, it takes time to make a hook determination even though false detection may be prevented. The predetermined time period here is a time period set in consideration of a variation time period of voltage from the exchange. Furthermore, in this case, an off-hook state itself of the external telephone is not able to be detected during the predetermined time period.

On the other hand, in this embodiment, a determination as to whether or not direct-current voltage stability during a period for which a call signal has been turned off is less than 5 V/200 ms is one of criteria by which to make a determination of off-hook or not, and false detection may thereby be reduced while making a hook determination quickly. In other words, in this embodiment, a hook determination is made on the basis of an amount of change in direct-current voltage, it does not thereby take time to make a hook determination, and a time period for which the user waits may be reduced in comparison with related art. That is, a time period for which an off-hook state itself of the external telephone is not able to be detected may be shortened in comparison with the related art.

This embodiment enables a larger reduction in size and costs than that in a current detection system in which, when the external telephone is put in an off-hook state, a line current flowing through the telephone line via the external telephone is detected by a circuit constituted by a photo-coupler and so forth.

Furthermore, in this embodiment, the modem 108 of the communication unit includes the voltage threshold determination unit 212 and the voltage stability determination unit 214. The communication unit includes these units, and thus a voltage threshold determination and a voltage stability determination may be made quickly even if communication is relatively slow. Also, false detection of off-hook may be prevented by using existing components included in the communication unit.

Other Embodiments

A basic configuration of the present invention is not limited to the above description. The above-mentioned embodiment is one method for obtaining an effect of the present invention, and another method in which the same effect as that of the present invention is obtained even if another similar technique or different parameters are used is within the scope of the present invention.

For example, in the above-mentioned embodiment, the above description has been made by taking, as an example, the case where the external telephone is directly connected to the communication apparatus; however, the embodiment is not limited to this, and the telephone does not have to be directly connected to the communication apparatus. The case where the telephone is not directly connected to the communication apparatus is, for example, the case where the telephone and the communication apparatus are connected in parallel with the telephone line. In the present invention, in this case as well, false detection which may occur when a variation in line direct-current voltage due to a cause other than line capture occurs may be prevented.

According to the present invention, false detection which may occur when a variation in line direct-current voltage due to a cause other than line capture performed by an external telephone occurs may be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159299, filed Jul. 31, 2013, which is hereby incorporated by reference herein in its entirety.

What is claimed is:

1. An apparatus to which a telephone line can be connected, the apparatus comprising:
    a first determination unit configured to determine, based on a change amount of a line direct-current voltage from the telephone line per time period, whether the line direct-current voltage is stable during a stop period for which, after supplying of the call signal from the telephone line, supply of the call signal from the telephone line is being stopped;
    a second determination unit configured to determine whether a value of the line direct-current voltage from the telephone line is equal to or lower than a first threshold; and
    a third determination unit configured to, if the first determination unit determines that the line direct-current voltage is stable and if the second determination unit determines that the line direct-current voltage is the first threshold or lower, determine that the telephone line has been captured.

2. The apparatus according to claim 1,
wherein, if the change amount of the line direct-current voltage per time period is less than a second threshold during the stop period, the first determination unit determines that the line direct-current voltage is stable, and
wherein, if the change amount of the line direct-current voltage per time period is not less than the second threshold during the stop period, the first determination unit determines that the line direct-current voltage is unstable.

3. The apparatus according to claim 2,
wherein the second threshold is a value set based on a variation of the line direct-current voltage, during the stop period, due to a cause other than capture of the telephone line.

4. The apparatus according to claim 2,
wherein the second threshold is a value set in accordance with a place where the apparatus is installed, or a type of an exchange that supplies the call signal.

5. The apparatus according to claim 1, further comprising a first detection unit configured to detect a line direct-current voltage from the telephone line.

6. The apparatus according to claim 1, further comprising a second detection unit configured to detect a call signal from the telephone line,
wherein, if the second detection unit detects the call signal from the telephone line and then detects that supply of the call signal has been stopped, the first determination unit determines whether the line direct-current voltage is stable.

7. The apparatus according to claim 1,
wherein a data access arrangement includes the first detection unit.

8. The apparatus according to claim 1, further comprising a modem,
wherein the modem includes at least one of the first determination unit, the second determination unit, and the third determination unit.

9. The apparatus according to claim 1, wherein the first determination unit does not operate during supplying of the call signal from the telephone line.

10. The apparatus according to claim 1, wherein the third determination unit does not operate during supplying of the call signal from the telephone line.

11. The apparatus according to claim 1, wherein the third determination unit determines that the telephone line has not been captured, if the first determination unit determines that the line direct-current voltage is not stable.

12. The apparatus according to claim 1, wherein the third determination unit determines that the telephone line has been captured, if the second determination unit determines that the line direct-current voltage is the first threshold or lower during a period before supplying of the call signal from the telephone line.

13. The apparatus according to claim 1, wherein the first determination unit determines every a predetermined time during the stop period.

14. A communication method in a communication apparatus to which a telephone line can be connected, the communication method comprising:
determining whether a line direct-current voltage from the telephone line is stable based on a change amount of a line direct-current voltage from the telephone line per time period during a stop period for which, after supplying of the call signal from the telephone line, supply of the call signal from the telephone line is being stopped;
determining whether a value of the line direct-current voltage from the telephone line is equal to or lower than a first threshold; and
if it is determined that the line direct-current voltage is stable and if it is determined that the line direct-current voltage is the threshold or lower, determining that the telephone line has been captured.

15. A non-transitory storage medium storing a program for causing a computer to execute the method according to claim 14.

* * * * *